(12) United States Patent
Yang et al.

(10) Patent No.: US 8,810,948 B2
(45) Date of Patent: Aug. 19, 2014

(54) OVER-SAMPLED SIGNAL EQUALIZER

(71) Applicant: LSI Corporation, Milpitas, CA (US)

(72) Inventors: Shaohua Yang, San Jose, CA (US); Jin Lu, Lafayette, CO (US); Weijun Tan, Longmont, CO (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/722,296

(22) Filed: Dec. 20, 2012

(65) Prior Publication Data

US 2014/0177082 A1 Jun. 26, 2014

(51) Int. Cl.
*G11B 5/035* (2006.01)
*G11B 5/09* (2006.01)
*G11B 20/10* (2006.01)

(52) U.S. Cl.
CPC ............................ *G11B 20/10* (2013.01)
USPC .............................. 360/65; 360/39

(58) Field of Classification Search
CPC .................. G11B 20/10268; G11B 20/10287; G11B 20/10472
See application file for complete search history.

(56) References Cited

U.S. PATENT DOCUMENTS

| | | | |
|---|---|---|---|
| 6,377,529 B1 | 4/2002 | Lee et al. | |
| 6,594,094 B2 | 7/2003 | Rae et al. | |
| 7,564,388 B2 | 7/2009 | Lerdworatawee et al. | |
| 2005/0068650 A1* | 3/2005 | Annampedu et al. | 360/39 |
| 2005/0264922 A1* | 12/2005 | Erden et al. | 360/78.04 |
| 2008/0279316 A1* | 11/2008 | Chen et al. | 375/345 |
| 2011/0075718 A1* | 3/2011 | Liu et al. | 375/232 |

OTHER PUBLICATIONS

K. Yamaguchi et al., "12 Gb/s Duobinary Signaling with x2 Oversampled Edge Equalization," IEEE International Solid-State Circuits Conference, Session 3, Backplane Transceivers, 2005, pp. 70-71.
A. Tkacenko et al., "A New Eigenfilter Based Method for Optimal Design of Channel Shortening Equalizers," IEEE International Circuits and Systems (ISCAS), 2002, 4 pages.
U.S. Appl. No. 13/628,513, filed in the name of J. Lu et al. Sep. 27, 2012 and entitled "Data-Dependent Equalizer Circuit.".
U.S. Appl. No. 13/628,579, filed in the name of S. Yang et al. Sep. 27, 2012 and entitled "Branch Metric Computation and Noise Predictive Calibration/Adaptation for Over-Sampled Y Samples."

* cited by examiner

*Primary Examiner* — Daniell L Negron
(74) *Attorney, Agent, or Firm* — Ryan, Mason & Lewis, LLP

(57) ABSTRACT

An apparatus comprises read channel circuitry and signal processing circuitry associated with the read channel circuitry. The signal processing circuitry is configured to: equalize an oversampled digital data signal to determine an equalized digital data signal, filter the equalized digital data signal, determine a hard decision and reliability of the filtered digital data signal, and decode the filtered digital data signal based at least in part on the hard decision and reliability. The oversampled digital data signal comprises a first set of sampled digital data and a corresponding second set of sampled digital data, each of the samples in the first set of sampled digital data being offset from a corresponding one of the sample in the second set of sampled digital data by a phase difference.

20 Claims, 5 Drawing Sheets

OVER-SAMPLED SIGNAL EQUALIZER

FIELD OF THE INVENTION

The field of the invention relates to signal processing, and, more particularly, to processing of digital data signals.

BACKGROUND

Disk-based storage devices such as hard disk drives (HDDs) are used to provide non-volatile data storage in a wide variety of different types of data processing systems. A typical HDD comprises a spindle which holds one or more flat circular storage disks, also referred to as platters. Each storage disk comprises a substrate made from a non-magnetic material, such as aluminum or glass, which is coated with one or more thin layers of magnetic material. In operation, data is read from and written to tracks of the storage disk via a read/write head that is moved precisely across the disk surface by a positioning arm as the disk spins at high speed.

SUMMARY

In one embodiment, an apparatus comprises read channel circuitry and signal processing circuitry associated with the read channel circuitry. The signal processing circuitry comprises: an equalizer having an input coupled to an output of an analog-to-digital converter, the equalizer being configured to determine an equalized digital data signal from an over-sampled digital data signal; a filter having an input coupled to an output of the equalizer, the filter being configured to filter the equalized digital data signal; a detector having an input coupled to an output of the filter, the detector being configured to determine a hard decision and reliability of the filtered digital data signal; and a decoder with an input coupled to an output of the detector, the decoder being configured to decode the filtered digital data signal based at least in part on the hard decision and reliability. The oversampled digital data signal comprises a first set of sampled digital data and a corresponding second set of sampled digital data, each of the samples in the first set of sampled digital data being offset from a corresponding one of the samples in the second set of sampled digital data by a phase difference.

Other embodiments of the invention include, by way of example and without limitation, methods, storage devices, virtual storage systems, integrated circuits and computer-readable storage media having computer program code embodied therein.

DETAILED DESCRIPTION

Embodiments of the invention will be illustrated herein in conjunction with exemplary disk-based storage devices, read channel circuitry and associated signal processing circuitry for processing read channel data signals. It should be understood, however, that these and other embodiments of the invention are more generally applicable to any storage device in which improved signal processing is desired. Additional embodiments may be implemented using components other than those specifically shown and described in conjunction with the illustrative embodiments.

| The following acronyms are utilized in this description: | |
|---|---|
| DFIR | Discrete Finite Impulse Response |
| HDD | Hard Disk Drive |
| LDPC | Low-Density Parity-Check |
| MAP | Maximum a Posteriori Probability |
| NPFIR | Noise Predictive Finite Impulse Response |
| RAID | Redundant Array of Independent Storage Devices |
| RPM | Revolutions Per Minute |
| RS | Reed Solomon |
| SOVA | Soft-output Viterbi Algorithm |

Figure 1:
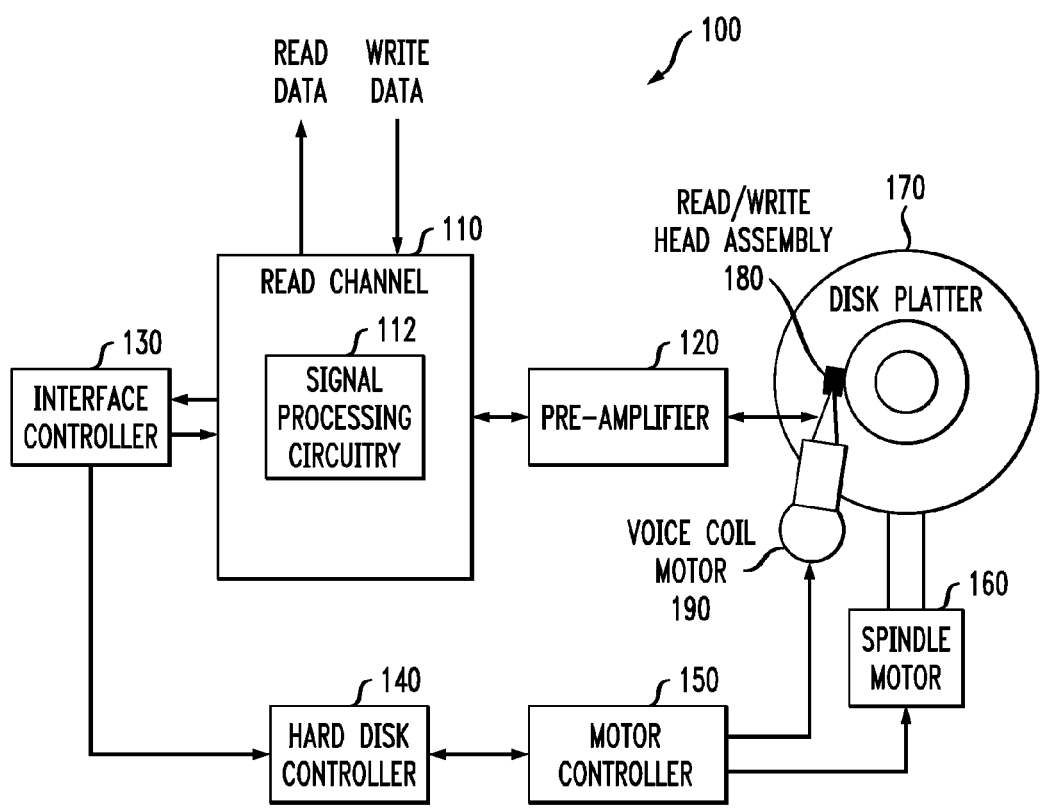
FIG. 1 shows a disk-based storage device, according to an embodiment of the invention.

FIG. 1 shows a disk-based storage device 100 including read channel circuitry 110 having signal processing circuitry 112 in accordance with various embodiments of the invention. Although shown in FIG. 1 as being incorporated within read channel circuitry 110, the signal processing circuitry 112 may also be implemented at least in part externally to the read channel circuitry 110. Storage device 100 may be, for example, a hard disk drive. Storage device 100 also includes a preamplifier 120, an interface controller 130, a hard disk controller 140, a motor controller 150, a spindle motor 160, a disk platter 170, read/write head assembly 180, and voice coil motor 190. Interface controller 130 controls addressing and time of data to and from disk platter 170. In some embodiments, disk platter 170 includes magnetic signals recorded in accordance with either a longitudinal or a perpendicular recording scheme.

Read/write head assembly 180 is positioned by voice coil motor 190 over a desired data track on disk platter 170. Motor controller 150 controls the voice coil motor 190. Motor controller 150 controls the voice coil motor 190 to position read/write head assembly 180 in relation to disk platter 170 and drives spindle motor 160 by moving read/write head assembly 180 to the proper data track on disk platter 170 under direction of hard disk controller 140. Spindle motor 160 spins disk platter 170 at a determined spin rate in revolutions per minute (RPM).

Once read/write head assembly 180 is positioned adjacent the proper data track, magnetic signals representing data on disk platter 170 are sensed by read/write head assembly 180 as disk platter 170 is rotated by spindle motor 160. The sensed magnetic signals are provided as an analog signal representative of the magnetic data on disk platter 170. This analog signal is transferred from read/write head assembly 180 to read channel circuitry 110 via preamplifier 120. Preamplifier 120 is operable to amplify the analog signals accessed from disk platter 170. In turn, read channel circuitry 110 decodes and digitizes the received analog signal to recreate the information originally written to disk platter 170. This data is provided as read data.

Various elements of the storage device 100 may be implemented at least in part within a processing device. A processing device includes a processor and a memory, and may be implemented at least in part within an associated host computer or server in which the storage device 100 is installed. Portions of the processing device may be viewed as comprising "control circuitry" as that term is broadly defined herein.

It is important to note that storage device 100 may include other elements in addition to or in place of those specifically shown, including one or more elements of a type commonly found in a conventional implementation of such a storage device. These and other conventional elements, being well understood by those skilled in the art, are not described in detail herein. It should also be understood that the particular arrangement of elements shown in FIG. 1 is presented by way of illustrative example only. Those skilled in the art will recognize that a wide variety of other storage device configurations may be used in implementing embodiments of the invention.

In order to increase detection performance, embodiments of the invention utilize a multiple input, single output equalizer scheme which effectively improves detection performance while reducing the signal path from two to one.

Figure 2:
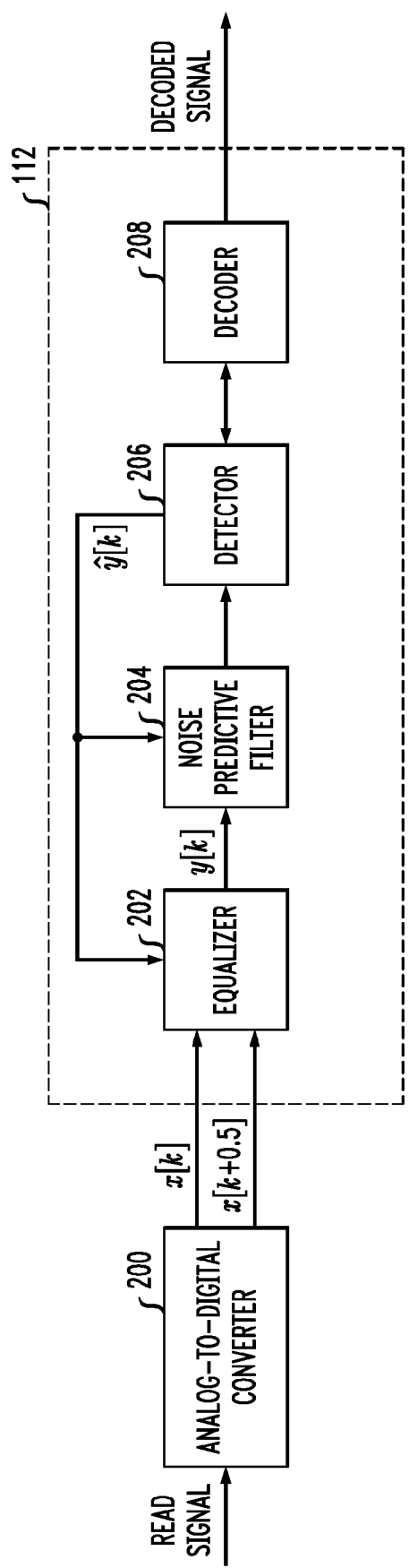
FIG. 2 is a detailed view of respective portions of the signal processing circuitry of FIG. 1, according to an embodiment of the invention.

Referring now to FIG. 2, an example of signal processing circuitry 112 is shown. A hard drive read signal is received at an analog-to-digital converter 200. The analog-to-digital converter 200 produces an oversampled digital data signal based on an analog hard drive read signal. The oversampled digital data signal comprises a set of integer bit phase index samples x[k] and a set of at least one other phase index samples, x[k+m], where 0<m<1. In FIG. 2, an example is shown where the samples are produced at 0.5 indexes x[k+0.5]. It is important to note, however, that other indexes may be used. The samples x[k] and x[k+0.5] are input to equalizer 202. The equalizer 202 outputs a single equalized digital data signal. The equalized digital data signal may comprise a set of equalized samples y[k] or y-samples. By using inputs at two different sampling phases, the equalizer can achieve a maximal degree of freedom in equalizer filtering, thus leading to a higher quality equalized digital data signal which is not dependent on a single sampling rate.

Embodiments of the invention provide several advantages relative to conventional approaches. For example, in some arrangements there may be a different optimal sampling phase for timing and gain loop performance than the optimal sampling phase for backed detection and decoding error rate. Thus, embodiments of the invention can intentionally let the front-end processing be locked into one optimal sampling phase for stable timing and gain loops. For example, although not shown in FIG. 2, a front-end detector or loop detector may receive the samples x[k] from the analog-to-digital converter 200 to perform timing and gain functionality. As shown in FIG. 2, the backend processing in the detector 206 and decoder 208 uses the samples at another sampling phase, or a combination of the optimal sampling phase samples used in the timing and gain loops and samples at another sampling phase. This is shown in FIG. 2 where the oversampled equalizer 202 receives samples x[k] and x[k+0.5] and outputs the combined equalized samples y[k] as will be described in further detail below. However, in other embodiments the backend processing in the detector 206 and decoder 208 may use only samples x[k+0.5], to decouple the optimal phases for the front end and backend processing. Thus, in some embodiments the equalizer 202 may be a self-adaptive equalizer which automatically picks the optimal weighting between x[k] and x[k+0.5].

The equalizer 202 may thus receive a first set of sampled digital data and a second set of sampled digital data from the analog-to-digital converter. Respective ones of the samples in the first set of sampled digital data and corresponding ones of the samples in the second set of sampled digital data are offset by a phase difference. Each of the first set of sampled digital data and the second set of sampled digital data may comprise N samples. The equalized digital data signal comprises a third set of N equalized samples. As described above, each sample in the third set of N equalized samples may be a combination of corresponding samples in the first and second sets of samples.

The equalizer 202 may comprise a set of discrete finite impulse response (DFIR) filters, or DFIRs. Each DFIR has a set of coefficients, aj. The equalized samples y[k] may be determined according to the following equation:

$$y[k] = \sum_{j=0}^{J} (x[k+s-j]a_j + x[k+s-j+0.5]a_{j+0.5})$$

where s is a delay term and J is the order of the DFIRs. The oversampled equalizer 202 thus reduces misequalization at the equalizer output by using the two sampling phases k and k +0.5 jointly. The equalized samples y[k] are input to a noise predictive filter 204. The noise predictive filter may comprise one or more noise predictive finite impulse response (NPFIR) filters or NPFIRs. The noise predictive filter 204 filters the equalized samples y[k].

The detector 206 determines a hard decision and reliability of the equalized samples y[k]. The detector 206 may comprise a variety of detector types, including a soft-output Viterbi algorithm (SOYA) detector or a maximum a posteriori probability (MAP) detector, or some combination of SOVA and MAP detectors. The hard decision, ŷ[k], may be used as feedback for the equalizer 202 and the noise predictive filter 204. In some embodiments, the reliability of the equalized samples may also be used as feedback for the equalizer 202 and noise predictive filter 204. The decoder 208 will decode the read signal based at least in part on the hard decision and reliability of the equalized signal. In some embodiments, the detector 206 and the decoder 208 will exchange information and perform an iterative decoding process. The decoder 208 will output a decoded digital data signal. The decoder 208 may be a variety of different decoder types. For example, in some embodiments the decoder 208 may be a low-density parity check (LDPC) decoder. In other embodiments, the decoder 208 may be a Reed Solomon (RS) decoder.

The set of coefficients {a} associated with the DFIRs of the equalizer 202 may be optimized by minimizing the mean squared error between the equalized signal y[k] and the hard decision ŷ[k] according to the following equation $$\frac{1}{N}\sum_{k=1}^{N}(y[k] - \hat{y}[k])^2$$

where N is a number of samples. The coefficients associated with NPFIRs of the noise predictive filter 204 may be similarly optimized.

Figure 3:
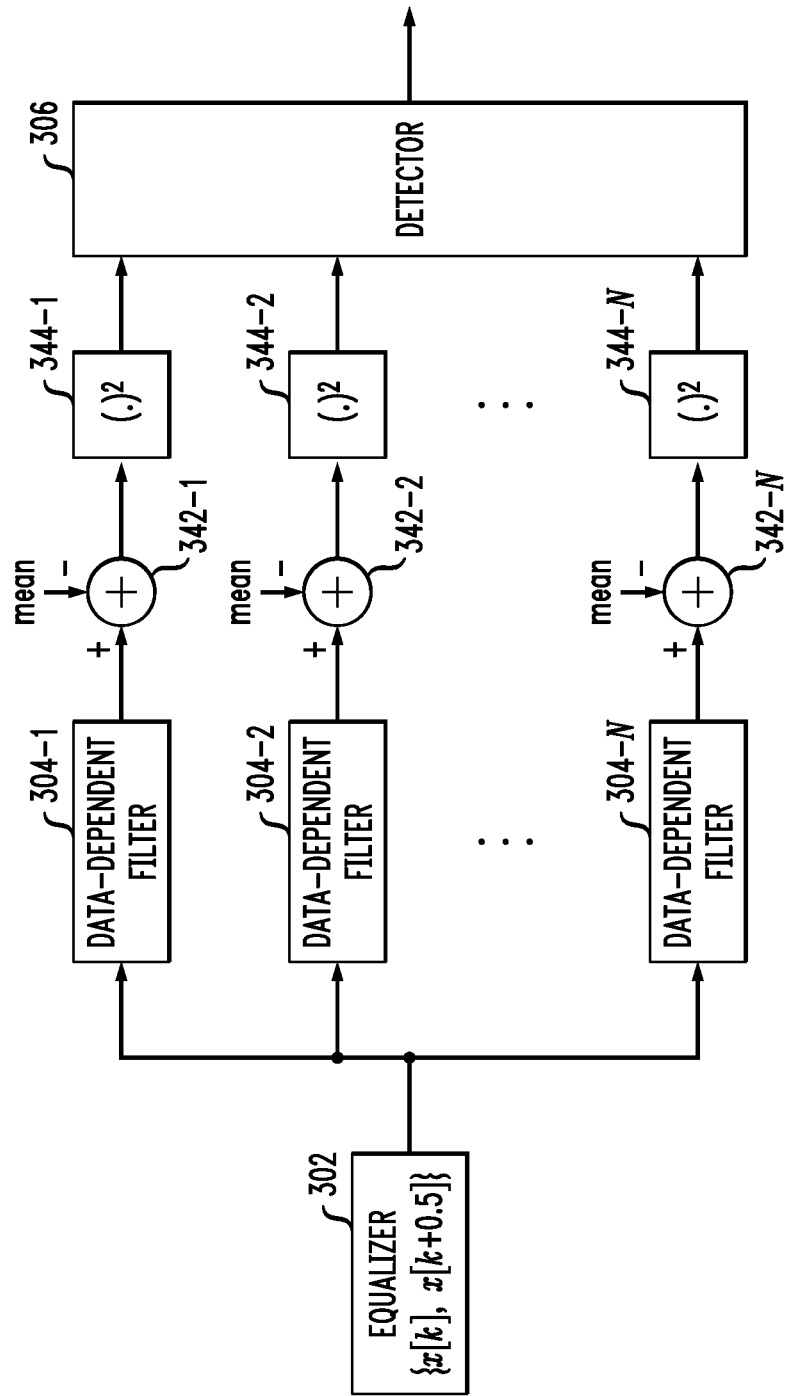
FIG. 3 illustrates a view of a portion of signal processing circuitry, according to an embodiment of the invention.

FIG. 3 shows an arrangement where data-dependent filters are used. The oversampled equalizer 302 combines the samples x[k] and x[k+0.5] as described above to create a set of equalized samples y[k]. The equalized samples y[k] are input to a number of data-dependent filters 304-1 to 304-N. Each of the data-dependent filters 304 may comprise a number of DFIRs and NPFIRs. Each of the data-dependent filters can be optimized for a particular type of data. For example, data-dependent filter 304-1 could be optimized for low frequency noise inputs, while data-dependent filter 304-2 could be optimized for higher frequency noise inputs. In other embodiments, each of the data-dependent filters 304 is optimized for a particular signal-to-noise ratio or other characteristic. The output of each of the data-dependent filters 304 is input to a respective one of signal combiners 342. Each of the signal combiners 342 subtracts a respective edgemean from respective filtered output of one of the data-dependent filters 304. Next, the outputs of the signal combiners 342 are input to respective multipliers 344. Each of multipliers 344 squares the output of a respective one of the signal combiners 342 and inputs the squared output to detector 306. The data-dependent filtering of FIG. 3 allows the coefficients {a} of the DFIRs to depend on the data condition of the trellis detector branch to incorporate more data-dependency in the signal processing circuitry.

Figure 4:
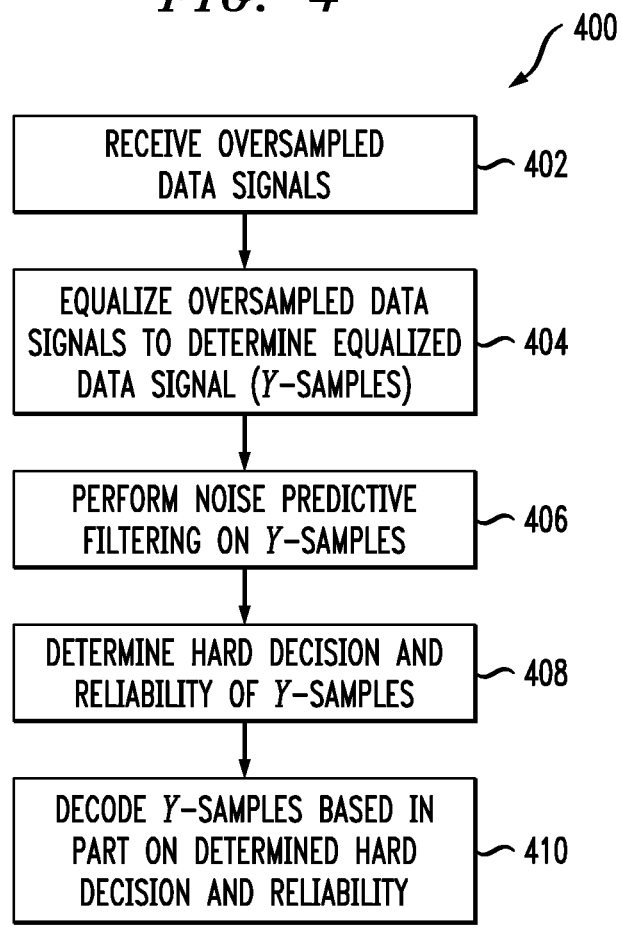
FIG. 4 illustrates a method of processing read channel data signals, according to an embodiment of the invention.

FIG. 4 shows a methodology 400 of signal processing. An oversampled data signal is received in step 402. In step 404, the oversampled data signal is equalized to determine an equalized data signal, an example of which are y-samples or y[k] as described above. Next, noise predictive filtering is performed on the y-samples in step 406. In step 408, a hard decision and reliability of the y-samples is determined. Finally, the y-samples are decoded in step 410 based at least in part on the hard decision and reliability.

As mentioned previously, the storage device configuration can be varied in other embodiments of the invention. For example, the storage device may comprise a hybrid HDD which includes a flash memory in addition to one or more storage disks.

In addition, storage device 100 may be coupled to or incorporated within a host processing device, which may be a computer, server, communication device, etc.

Figure 5:
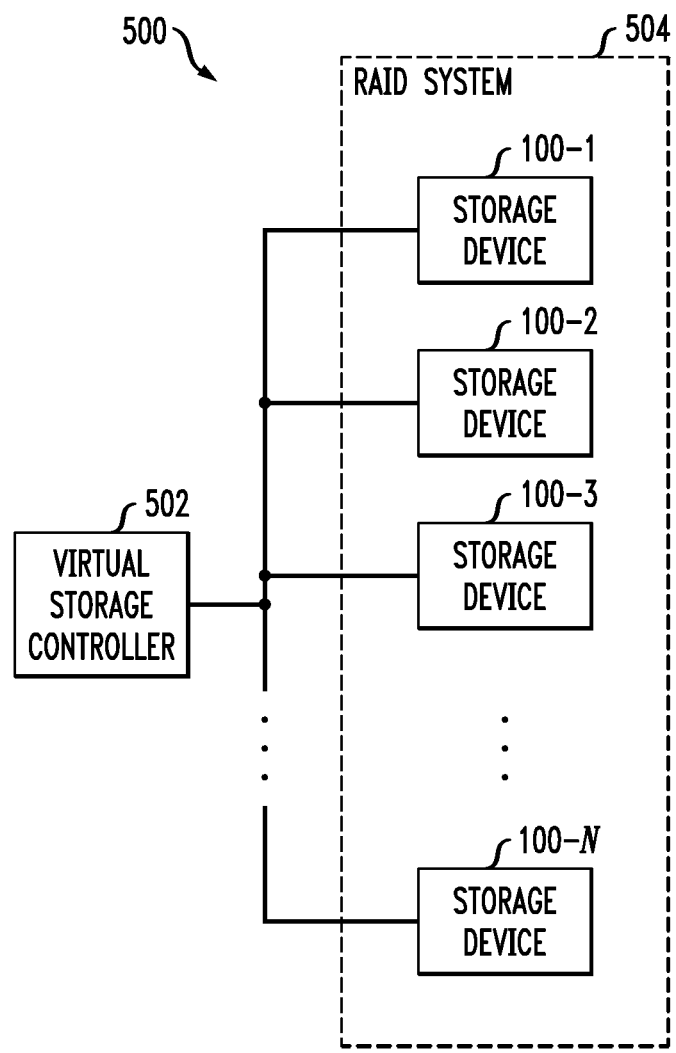
FIG. 5 shows a virtual storage system incorporating a plurality of disk-based storage devices of the type shown in FIG. 1, according to an embodiment of the invention.

Multiple storage devices 100-1 through 100-N possibly of various different types may be incorporated into a virtual storage system 500 as illustrated in FIG. 5. The virtual storage system 500, also referred to as a storage virtualization system, illustratively comprises a virtual storage controller 502 coupled to a RAID system 504, where RAID denotes Redundant Array of Independent storage Devices. The RAID system more specifically comprises N distinct storage devices denoted 100-1, 100-2, ... 100-N, one or more of which may be HDDs and one or more of which may be solid state drives. Furthermore, one or more of the HDDs of the RAID system are assumed to be configured to include read channel circuitry and associated signal processing circuitry as disclosed herein. These and other virtual storage systems comprising HDDs or other storage devices are considered embodiments of the invention.

It should again be emphasized that the above-described embodiments of the invention are intended to be illustrative only. For example, other embodiments can use different types and arrangements of storage disks, read/write heads, read channel circuitry, signal processing circuitry, decoders, filters, calibrators, detectors, and other storage device elements for implementing the described signal processing functionality. Also, the particular manner in which certain steps are performed in the signal processing may vary. These and numerous other alternative embodiments within the scope of the following claims will be apparent to those skilled in the art.

What is claimed is:

1. An apparatus comprising:
   read channel circuitry; and
   signal processing circuitry associated with the read channel circuitry, the signal processing circuitry comprising:
      an equalizer having an input coupled to an output of an analog-to-digital converter, the equalizer being configured to determine an equalized digital data signal from an oversampled digital data signal;
      a filter having an input coupled to an output of the equalizer, the filter being configured to filter the equalized digital data signal;
      a detector having an input coupled to an output of the filter, the detector being configured to determine a hard decision and reliability of the filtered digital data signal; and
      a decoder having an input coupled to an output of the detector, the decoder being configured to decode the filtered digital data signal based at least in part on the hard decision and reliability;
   wherein the equalizer is configured:
      to receive the oversampled digital data signal comprising a first set of sampled digital data and a corresponding second set of sampled digital data, where samples in the first set of sampled digital data are offset from corresponding ones of the samples in the second set of sampled digital data by a phase difference; and
      to combine one or more samples from the first set of sampled digital data with respective corresponding ones of the samples in the second set of sampled digital data to determine the equalized digital data signal.

2. The apparatus of claim 1, wherein the first set of sampled digital data comprises N samples, the second set of sampled digital data comprises N samples, and the equalized digital data signal comprises a third set of N equalized samples.

3. The apparatus of claim 1, wherein the filter comprises a noise predictive finite impulse response filter and wherein the noise predictive finite impulse response filter has a second input coupled to an output of the detector, the noise predictive finite impulse response filter being configured to adjust a set of noise predictive finite impulse response tap coefficients based at least in part on the hard decision.

4. The apparatus of claim 1, wherein the equalizer has a second input coupled to an output of the detector, the equalizer being configured to adjust a set of coefficients based at least in part on the hard decision.

5. The apparatus of claim 4, wherein the equalizer adjusts the set of coefficients to minimize a mean squared error between the equalized digital data signal and the hard decision received via the second input.

6. The apparatus of claim 4, wherein the equalizer comprises a discrete finite impulse response filter and the set of coefficients is a set of discrete finite impulse response tap coefficients.

7. The apparatus of claim 6, wherein the equalized digital data signal comprises a number of samples y[k] determined in accordance with the following equation:

$$y[k] = \sum_{j=0}^{J} (x[k+s-j]a_j + x[k+s-j+m]a_{j+m})$$

wherein x[k] is the first set of sampled digital data, x[k+m] is the second set of sampled digital data, m is a phase offset term, J is the order of the discrete finite impulse response filter, {a} is the set of discrete finite impulse response tap coefficients, k is a time index of the oversampled digital data signal, and s is a delay term.

8. The apparatus of claim 7, wherein the set of discrete finite impulse response tap coefficients {a} are adjusted to minimize a mean squared error determined in accordance with the following equation:

$$\frac{1}{N}\sum_{k=1}^{N}(y[k]-\hat{y}[k])^2$$

where $\hat{y}[k]$ is the hard decision.

9. The apparatus of claim 1, wherein the filter comprises two or more data-dependent filters, each of the two or more data-dependent filters having an input coupled to an output of the equalizer and an output coupled to an input of the detector.

10. The apparatus of claim 9, wherein each of the two or more data-dependent filters has a set of coefficients optimized for a given characteristic of the equalized digital data signal.

11. The apparatus of claim 10, wherein the given characteristic is a signal-to-noise ratio.

12. The apparatus of claim 1, wherein the detector comprises at least one of: a soft output Viterbi algorithm detector and a maximum a posteriori probability detector.

13. The apparatus of claim 1, further comprising a disk controller coupled to the read channel circuitry.

14. The apparatus of claim 1 wherein the read channel circuitry and associated signal processing circuitry are fabricated in at least one integrated circuit.

15. A storage device comprising the apparatus of claim 1.

16. A virtual storage system comprising the storage device of claim 15.

17. A method comprising the steps of:
 equalizing an oversampled digital data signal to determine an equalized digital data signal;
 filtering the equalized digital data signal;
 determining a hard decision and reliability of the filtered digital data signal; and
 decoding the filtered digital data signal based at least in part on the hard decision and reliability;
 wherein equalizing the oversampled digital data signal comprises:
  receiving a first set of sampled digital data and a corresponding second set of sampled digital data, where samples in the first set of sampled digital data are offset from corresponding ones of the samples in the second set of sampled digital data by a phase difference; and
  combining one or more samples from the first set of sampled digital data with respective corresponding ones of the samples in the second set of sampled digital data to determine the equalized digital data signal.

18. The method of claim 17, wherein the first set of sampled digital data comprises N samples, the second set of sampled digital data comprises N samples, and the equalized digital data signal comprises a third set of N equalized samples.

19. The method of claim 17, wherein filtering the equalized digital data signal uses at least one of a plurality of data-dependent filters, each of the data-dependent filters having a set of coefficients optimized for a given characteristic of the equalized digital data signal.

20. A storage device comprising:
 at least one storage medium;
 a read head configured to read data from the storage medium; and
 control circuitry coupled to the read head and configured to process data received from the read head;
 the control circuitry comprising:
 read channel circuitry comprising a decoder; and
 signal processing circuitry associated with the read channel circuitry, the signal processing circuitry comprising:
  an equalizer having an input coupled to an output of an analog-to-digital converter, the equalizer being configured to determine an equalized digital data signal from an oversampled digital data signal;
  a filter having an input coupled to an output of the equalizer, the filter being configured to filter the equalized digital data signal;
  a detector having an input coupled to an output of the filter, the detector being configured to determine a hard decision and reliability of the filtered digital data signal; and
  a decoder having an input coupled to an output of the detector, the decoder being configured to decode the filtered digital data signal based at least in part on the hard decision and reliability;
 wherein the equalizer is configured:
  to receive the oversampled digital data signal comprising a first set of sampled digital data and a corresponding second set of sampled digital data, where samples in the first set of sampled digital data are offset from corresponding ones of the samples in the second set of sampled digital data by a phase difference; and
  to combine one or more samples from the first set of sampled digital data with respective corresponding ones of the samples in the second set of sampled digital data to determine the equalized digital data signal.

* * * * *